Feb. 8, 1944.   R. BERINGER   2,341,075
CLUTCH
Filed June 18, 1941
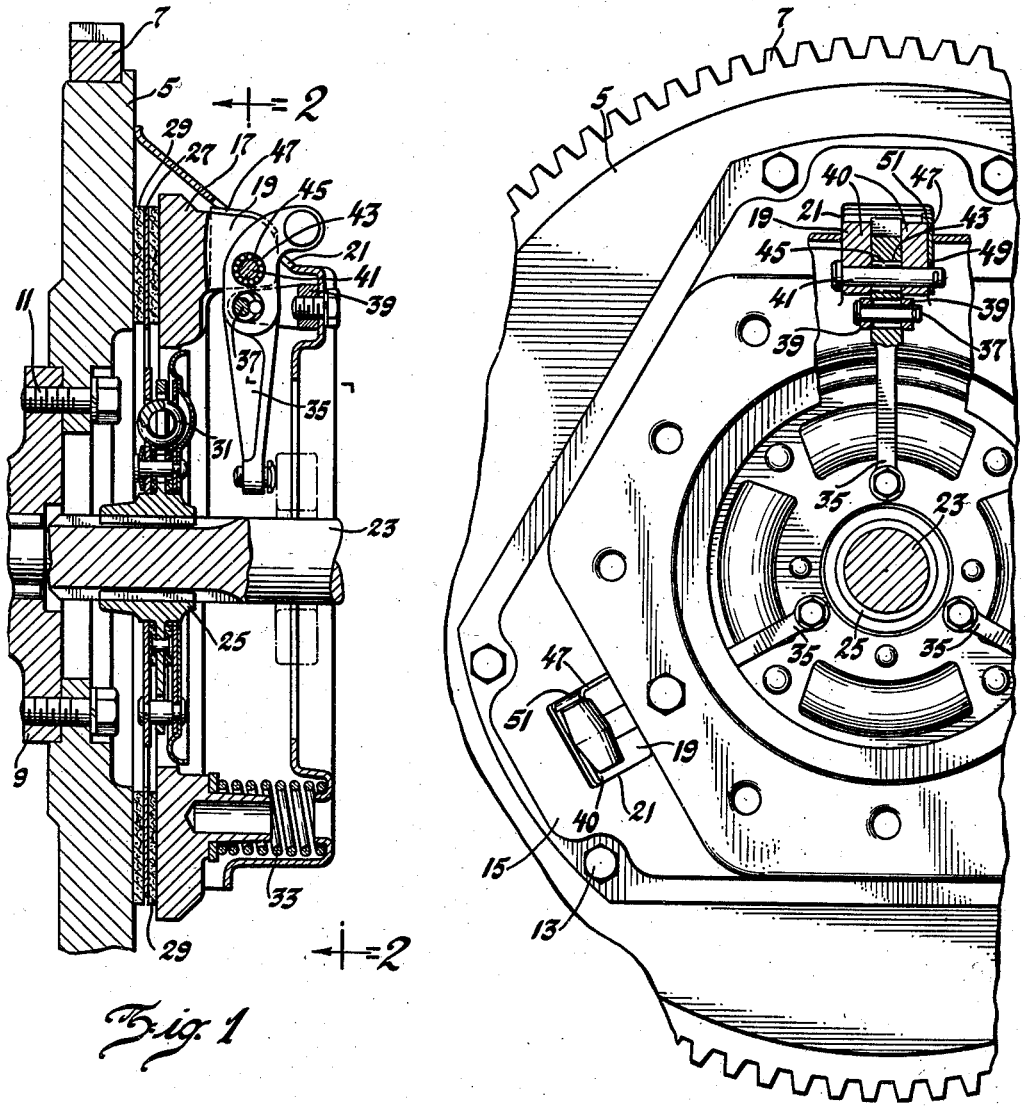
Fig. 1
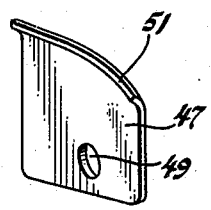
Fig. 3
Fig. 2
Inventor
Roscoe Beringer
By Blackmor, Spencer & Hint
Attorneys Patented Feb. 8, 1944

2,341,075

UNITED STATES PATENT OFFICE 2,341,075

CLUTCH

Roscoe Beringer, Detroit, Mich., assignor to General Motors Corporation, Detroit, Mich., a corporation of Delaware Application June 18, 1941, Serial No. 398,544

2 Claims. (Cl. 192—68)

This invention relates to friction clutches such as are used to couple the engine shaft of a motor vehicle to the transmission shaft.

An object of the invention is to eliminate squeaks and noises which sometimes occur during the period of clutch engagement or release.

Another object is the accomplishment of the major object by means which shall be efficient, simple and inexpensive.

On the drawing:

Figure 1 is a transverse section through a clutch equipped with my improvement.

Figure 2 is an elevation partly in section as seen from line 2—2 of Figure 1.

Figure 3 is a detail in perspective.

In vehicle clutches a squeak has been noticed in the periods of clutch engagement and release. Since the throwout mechanism is involved in the operation of clutch engagement and disengagement, efforts have been made to render the operation noiseless. These efforts eliminated some noise but there still remains the elusive squeak.

The present invention is the result of the discovery of the spot where the squeak occurs and of a remedy to eliminate it. In the engagement and release of the clutch the driving lug of the pressure plate may slide along the wall of the opening in the cover plate. Also the flywheel and cover assembly transmit engine torque to the pressure plate lugs while the pressure plate so reciprocates. The fact that the squeak occurs at the region of this contact between the driving lug and the wall of the opening of the cover constitutes the discovery, and the introduction of anti-friction means constitutes the remedy.

On the drawing, numeral 5 is a flywheel carrying a starter ring gear 7. The flywheel is secured to the engine shaft as by securing means 11. Carried by and secured to the flywheel is a cover 15, numeral 13 representing the fastening means. Within the enclosure is a pressure plate 17 having driving lugs 19 extending through openings 21 in the cover. The rotating driving assembly including the drive wheel and cover engages one side of the lugs to transmit engine rotation to the pressure plate.

Extending through the cover is a transmission shaft 23. It carries a hub 25. A driven disc 27 with facings 29 is connected to the hub by torque transmitting springs 31. This spring connecting means need not be described in further detail since it is not a part of this invention. Springs 33 push the pressure plate toward the flywheel whereby the driven disc is gripped between the flywheel and pressure plate to effect joint rotation of shaft 23 with the engine shaft. The pressure plate is withdrawn from the driven plate by a plurality of radially extending fingers 35, each suitably pivoted at 37 to a bracket 39 carried by the cover. The fingers are adapted to be rotated by a conventional throwout means. Each finger extends beyond its pivot and between furcations 40 of lug 19. A pivot pin 41 carried by the furcations of each lug extends through an opening 43 in the finger where it is surrounded by needle bearings 45.

The term "driving side" will serve to identify that side of lug 19 normally engaged by the wall of the opening 21. As the flywheel cover effects rotation of the pressure plate, to avoid the squeak in this region where the wall of opening 21 contacts lug 19 there is inserted a bronze bearing plate 47. The plate has an opening 49 which embraces the pin 41 and its upper edge 51 is shaped and bent to fit the upper edge of the adjacent furcation of the pressure plate lug. The elimination of the squeak has been accomplished by resort to the expedient mentioned above.

I claim:

1. In a friction clutch, a flywheel and cover assembly, said cover having an opening therein, a pressure plate having a lug extending through said opening and a bronze plate between a wall of said opening and the driving face of said lug, said clutch having a releasing finger fulcrumed to said cover, a pin pivotally connecting said lug to said finger, said bronze plate being supported on said pin.

2. In a friction clutch, a flywheel and cover assembly, said cover having an opening therein, a pressure plate having a lug extending through said opening and a bronze plate between a wall of said opening and the driving face of said lug, said clutch having a releasing finger fulcrumed to said cover, a pin pivotally connecting said lug to said finger, said bronze plate being supported on said pin, said bronze plate having an edge bent over the edge of said lug.

ROSCOE BERINGER.